(12) United States Patent
Brandt

(10) Patent No.: US 9,028,246 B2
(45) Date of Patent: May 12, 2015

(54) RESIDUAL GAS BURNER

(71) Applicant: Samuel Brandt, Esslingen (DE)

(72) Inventor: Samuel Brandt, Esslingen (DE)

(73) Assignee: Eberspaecher Climate Control Systems GmbH & Co. KG, Esslingen am Neckar (DE)

( * ) Notice: Subject to any disclaimer, the term of this patent is extended or adjusted under 35 U.S.C. 154(b) by 298 days.

(21) Appl. No.: 13/626,230

(22) Filed: Sep. 25, 2012

(65) Prior Publication Data

US 2013/0078539 A1 Mar. 28, 2013

(30) Foreign Application Priority Data

Sep. 26, 2011 (DE) .......................... 10 2011 083 407

(51) Int. Cl.
*F23C 5/08* (2006.01)
*H01M 8/04* (2006.01)
*F23D 14/02* (2006.01)
*F23D 14/06* (2006.01)
*F23D 14/22* (2006.01)
*F23G 7/06* (2006.01)

(52) U.S. Cl.
CPC ........... *H01M 8/04022* (2013.01); *F23D 14/02* (2013.01); *F23D 14/06* (2013.01); *Y02E 60/50* (2013.01); *F23D 14/22* (2013.01); *F23G 7/06* (2013.01)

(58) Field of Classification Search
CPC ......... F23D 14/58; F23D 14/02; F23D 14/06; F23L 7/007
USPC ............... 431/178, 179, 8, 12, 354, 350, 328; 126/39 E, 39 R; 429/408
See application file for complete search history.

(56) References Cited

U.S. PATENT DOCUMENTS

2007/0003896 A1 * 1/2007 Kaupert et al. ................ 431/350

FOREIGN PATENT DOCUMENTS

DE  10 2005 031 231 B3  1/2007
EP       1 140 340 B1  10/2001

* cited by examiner

*Primary Examiner* — Alfred Basichas
(74) *Attorney, Agent, or Firm* — Reinhart Boerner Van Deuren P.C.

(57) ABSTRACT

The present invention relates to a residual gas burner (13) for a fuel cell system (1) having to educt gas feeds (11, 12) for feeding an educt gas each to a combustion chamber (14) of the residual gas burner (13). An improved operation of the residual gas burner (13) is obtained when the educt gas feeds (11, 12) each comprise outlet openings (22, 27), wherein the outlet openings (22, 27) face the combustion chamber (14) and the outlet openings (22, 27) of one of the educt gas feeds (11, 12) face a first bottom surface (29) of the other educt gas feed (11, 12).

In addition, the invention relates to a fuel cell system (1) having such a residual gas burner (13).

16 Claims, 4 Drawing Sheets

RESIDUAL GAS BURNER

CROSS-REFERENCE TO RELATED PATENT APPLICATION

This patent application claims priority to German Application No. 102011083407.9, filed Sep. 26, 2011, the entire teachings and disclosure of which are incorporated herein by reference thereto.

FIELD OF THE INVENTION

The present invention relates to a residual gas burner for a fuel cell system and to a fuel cell system having such a residual gas burner.

BACKGROUND OF THE INVENTION

A residual gas burner is usually part of a fuel cell system. The fuel cell system additionally comprises at least one fuel cell, which comprises an anode and a cathode. For operating the fuel cell, an anode gas for the anode and a cathode gas for the cathode are necessary, which are fed to the cathode and to the anode respectively. Through the electrochemical reactions which take place in and/or on the anode and the cathode during the operation of the fuel cell, an anode waste gas and a cathode waste gas develop. The residual gas burner serves for the further usage of the cathode waste gas and of the anode waste gas, which are fed to the residual gas burner as educt gases. To this end, the residual gas burner comprises two educt gas feeds, which feed the respective educt gas to a combustion chamber of the residual gas burner. The respective educt gas feeds comprise outlet openings, through which the respective educt gas enters the combustion chamber where it is combusted. The heat created through the combustion of the educt gases can then be fed for example via a heat transfer device to the cathode gas upstream of the fuel cell in order to increase the efficiency of the fuel cell or of the fuel cell system. Disadvantageous here is that the residual gas burner, in particular due to a poor mixing-through of the educt gases in the combustion chamber, has a low efficiency. In addition, such residual gas burners are very heavy and through their design, are complex to manufacture.

SUMMARY OF THE INVENTION

The present invention therefore deals with the problem of stating an improved or at least alternative embodiment for a residual gas burner of the type mentioned at the outset, which is characterized in particular through an improved efficiency and/or through an easy and cost-effective design.

According to the invention, this problem is solved through the subjects of the independent claims. Advantageous embodiments are subject of the dependent claims.

The present invention is based on the general idea of equipping a residual gas burner for a fuel cell system with two educt gas feeds, each of which comprise at least one outlet opening for letting out a respective educt gas into a combustion chamber of the residual gas burner, and arranging the outlet openings of the one educt gas closer to the combustion chamber than the outlet openings of the other educt gas. Because of this, an improved mixing-through of the respective educt gases prior to the combustion takes place, which leads to an improved and more stable combustion or flame within the combustion chamber and consequently improves the efficiency of the residual gas burner. The modulation capability of the residual gas burner is also improved towards higher lambda values because of this.

In particular, first outlet openings of a first educt gas lie in a first plane, while second outlet openings of a second educt gas lie in a second plane, which is further distant from the combustion chamber than the first plane.

Corresponding to the inventive idea, the residual gas burner comprises a first educt gas feed and a second educt gas feed, which serve for the feeding of the first educt gas and of the second educt gas to the combustion chamber of the residual gas burner. In addition, the first educt gas feed comprises at least one first outlet opening for letting out the first educt gas into the combustion chamber and is arranged on a first top surface of a first outlet channel system of the first educt gas feed. Furthermore, the second educt gas feed comprises a second outlet channel system, which comprises a top surface, which for letting out the second educt gas into the combustion chamber, comprises at least one second outlet opening. The second top surface of the second outlet channel system and the first top surface of the first outlet channel system additionally face the combustion chamber, wherein the first outlet channel system has a first bottom facing away from the first top surface, which first bottom faces the second top surface. This means, in particular, that the second outlet channel system and thus the at least one second outlet opening are spaced further from the combustion chamber than the first outlet channel system and thus the at least one first outlet opening. The respective outlet channel systems can each comprise a channel or a plurality of channels, wherein at least one of the channels comprises at least one associated outlet opening. The outlet channel systems as well as the top surfaces and the bottom surfaces can have any shapes, they consequently do not necessarily have a flat shape.

Feeding the respective educt gas to the associated channels can be additionally realised by means of feeding channels. The respective educt gas feeds can comprise one or a plurality of such feeding channels, which feeds/feed the respective educt gas for example from an inlet of the associated educt gas feed or the associated outlet channel system to the respective channels via a channel inlet or a plurality of channel inlets.

With a preferred embodiment, the second outlet channel system is arranged on the first bottom surface of the first outlet channel system. Practically, the first outlet channel system and the second outlet channel system are designed as separate components. Preferred is an embodiment, wherein the respective educt gas feeds and thus the respective outlet channel systems are designed as separate components. The arrangement of the second outlet channel system and thus of the second top surface on the first bottom surface of the first outlet channel system means in particular that the educt gas feeds are directly adjacent. The educt gas feeds in this case can be mechanically connected to each other, wherein the connection between the educt gas feeds can be realised in any way, provided they are suitable for the temperatures and pressures that are present there or in the combustion chamber. The separate design of the respective educt gas feeds has as a consequence in particular that the residual gas burner can be assembled from individual modules. This leads to a simplified and thus cost-effective production of the residual gas burner. In addition, the feeds or the channel systems can be structured in a simple manner, which facilitates a cost-effective production.

Practically, the first outlet channel system comprises at least one passage opening which allows the second educt gas flowing through the at least one second outlet opening to pass into the combustion chamber. The respective passage opening is spaced from the at least one first outlet opening and in the direction of the combustion chamber is in alignment with the at least one second outlet opening.

Preferred are embodiments, wherein the respective outlet channel systems each have a plurality of outlet openings. Accordingly, the first outlet system can also have a plurality of passage openings, which are spaced from the first outlet openings and each of which is in alignment with at least one of the second outlet openings. With a further embodiment, at least two of the first outlet openings have a different size. Also conceivable are embodiments, wherein at least two of the first outlet openings additionally or alternatively have a different shape. The same applies to the second outlet openings. This means that at least two of the second outlet openings have a different size and/or shape.

Here, according to a further preferred embodiment, the residual gas burner can be designed so that the first outlet openings are designed larger than the second outlet openings. This is practical, in particular, with embodiments, wherein the first educt gas feed is designed for larger flow rates than the second educt gas feed. This means that the residual gas burner is designed in such a manner that a volume of the first educt gas that is larger than that of the second educt gas can enter the combustion chamber. The first educt gas feed to this end can be designed larger or provide a larger flow cross section than the second educt gas feed for the associated educt gas. Accordingly, the first outlet openings can then be designed larger than the second outlet openings.

According to a preferred embodiment, the first educt gas feed is designed U-shaped and comprises two legs. The first outlet channel system in this case is preferably formed with pipes which run parallel between the legs. At least one of the pipes, preferentially however all, each form a first channel of the first outlet channel system, wherein the respective pipes are spaced from one another along a direction that runs transversely to the parallel arrangement in order to form between said passage openings of the first outlet channel system. Accordingly, the legs of the U-shaped educt gas feed can be designed as first feed channels and feed the first educt gas to the pipes. The first educt gas feed can thus comprise two first feed channels, which feed the first educt gas to the pipes via the ends of the pipes facing the legs. The respective first outlet opening is additionally arranged on the first top surface and thus on the top surface of one of the pipes.

Additionally, the respective first feed channel can comprise at least one bypass opening, which is arranged laterally or in a marginal region of the combustion chamber or connected to a bypass path leading passed the combustion chamber. The bypass openings in particular serve the purpose of reducing the flow rate of the first educt gas into the combustion chamber. Within a combustion chamber of the residual gas burner, a marginal region can be provided laterally of the combustion chamber, which is not assigned any second outlet openings, so that there only the bypass openings are provided and only the first educt gas enters into the marginal region. The educt gas flow entering the combustion chamber via the bypass openings is then guided laterally along walls of the combustion chamber enclosing the combustion chamber, which means a thermal relief of the combustion chamber walls. Optionally, at least one bulkhead can be arranged in the combustion chamber, which runs parallel to a combustion chamber wall and in at least one region adjoining the first surface separates the marginal region from the combustion chamber. Distally to the first surface, the respective bulkhead can be overflowable, so that the respective marginal region there is fluidically connected to the combustion chamber. Insofar as the respective marginal region is separated from the combustion chamber through at least one such bulkhead, the marginal region includes the bypass path at least partially passing by the combustion chamber. The bypass openings are preferentially arranged also on the first top surface.

If the opening arranged on the first feed channel serves as bypass opening, the first educt gas flowing out through it can also be utilised for cooling the combustion chamber or the residual gas burner. The bypass opening is arranged for example between the corresponding bulkhead of the combustion chamber and an outer wall or combustion chamber wall of the residual gas burner. These walls form a hollow space through which the first educt gas flowing out of the respective bypass opening can flow, and through which hollow space the bypass path leads.

The second top surface of the second outlet channel system can be designed as plate. The plate delimits a second channel of the second outlet channel system, which supplies all second outlet openings with the second educt gas. In other words, the second outlet channel system can merely comprise one single second channel, which supplies all second outlet openings with second educt gas, wherein the second outlet openings are arranged in the plate and accordingly on the second top surface. Here, the second channel and a second feed channel coincide or correspond to each other at least partially.

With an advantageous further development, the second outlet channel system or the second educt gas feed is produced in shell design. Accordingly, the second top surface can be formed as a second top surface shell, which with a second bottom surface designed as a second bottom shell forms the second outlet channel system or the second educt gas feed.

Also preferred is an embodiment, wherein the first outlet channel system or the first educt gas feed is produced in shell design. Accordingly, the first educt gas feed comprises a first top surface shell and a first bottom shell designed complementarily thereto, which form the first outlet channel system or the first educt gas feed.

Preferred is an embodiment, wherein both the first outlet channel system or the first educt gas feed as well as the second outlet channel system or the second educt gas feed are produced in shell design. The respective shells, i.e. the respective top surface shells and/or the respective bottom shells are produced for example through a deep-drawing method. The respective shells can be formed from sheet metal, in particular of iron metals and/or light metals through the deep-drawing and subsequently connected to each other. As examples for connecting possibilities of the respective shells, welding, soldering, screwing or gluing are pointed out here, wherein any types of the connection of the respective associated shells are conceivable provided these connection types are suitable for the thermodynamic conditions prevailing in the combustion chamber. Through the shell design of the shells formed in particular from sheet metal, a cost-effective production of the educt gas feeds and thus of the residual gas burner is possible. In addition, the weight of the residual gas burner is reduced because of this, which is advantageous in particular with mobile applications of the associated fuel cell system.

According to a further embodiment, the first outlet openings are arranged along preferentially straight first lines. A plurality of first outlet openings can then be arranged on different first lines in each case, wherein the respective first lines are preferentially arranged next to one another, in particular lie in a first plane and run parallel. Accordingly, the second outlet openings with a further embodiment are arranged on in particular straight second lines, wherein the second lines are preferentially arranged next to one another, run parallel to one another and can in particular lie in a second plane. The respective outlet openings arranged on one of the lines can have different sizes and/or shapes.

The outlet openings arranged on one of the lines can in particular become smaller along a flow direction in the respective channel. In particular, this serves the purpose of homogenising a flow rate of the respective educt gas into the combustion chamber. This means, the respective outlet openings are dimensioned or formed in such a manner that a flow velocity through all first outlet openings and/or all second outlet openings in each case is substantially the same. Reducing the outlet openings along the corresponding flow direction is based on the knowledge that the pressure in the respective educt gas in the respective channel increases along the flow direction of the educt gas due to the damming-up of the educt gas in the respective channel system. This is countered, insofar, that the size and thus a flow cross section of the outlet openings along the flow direction becomes smaller, as a result of which the mass flow or flow rates through all outlet openings of the associated educt gas feed can be adapted to one another. If a channel is supplied with educt gas via two feed channels on two channel inlets located opposite, the outlet openings of this channel can consequently be formed in such a manner that its size decreases towards the centre of the arrangement on the line.

Alternatively or additionally, the homogenisation of the flow rate of the respective educt gas can be realised through adapting the size of the associated channel inlets. The respective channel inlets can for example comprise a constriction, wherein the throttling effect of the constrictions along the flow direction of the associated educt gas in the feed channel supplying the channels or in the feed channels supplying the channels, increases. In other words, the flow cross section made available through the channel inlets becomes smaller along the flow direction in the associated feed channels, so that the pressure in the educt gas which increases through the damming-up can be offset along the flow direction.

Here, an embodiment is preferred, wherein the respective constrictions are integrally formed in the associated outlet channel system. The constrictions are thus realised through different shapes or sizes of the channel inlets.

A further possibility for configuring a homogeneous flow rate is the reduction in size of the channels or of the flow cross sections of the channels along the flow direction of the associated feed channel or the associated feed channels.

Additionally or alternatively, the feed channel or the feed channels can taper along the flow direction of the educt gas flowing within them in order to reduce their flow cross section along the flow direction. This is practically the case when along the respective feed channel at least two associated channels or at least two associated outlet openings are arranged, which this second feed channel supplies with second educt gas.

Preferred is an embodiment, wherein the first lines and second lines are each arranged next to one another. The first lines and the second lines in this case are preferably arranged alternating along a direction transversely to the longitudinal directions of the straight lines, wherein this longitudinal direction preferably is the flow direction in the respective channels. If for example the channels of one of the outlet channel systems are designed as pipes, the corresponding lines can run in particular parallel to the pipes. This means that the associated outlet openings are arranged line-like on the top surface of the pipes.

The bypass openings of the first feed channels can also be arranged along bypass lines, which practically extend along the associated first feed channel. These run transversely, in particular perpendicularly to the first lines.

The passage openings can be formed through linear elongated holes or slits, which are arranged next to one another, run parallel to the first lines and alternate with these, while they can practically lie in the first plane and are aligned with the second lines preferably perpendicularly to the first plane.

According to an advantageous further development, the first outlet openings are arranged line-like on first lines along the first channels of the first outlet channel system formed as pipes and/or of the at least one first feed channel, while the second outlet openings are arranged line-like on second lines which are in alignment with the passage openings formed through the spaced pipes.

With a further preferred embodiment, one of the educt gas feeds is configured as anode waste gas ducting of the fuel cell system. Preferentially, the first educt gas feed designed for larger flow rates is configured as cathode waste gas ducting, while the second educt gas feed is configured as anode waste gas ducting. Here, use is made of the knowledge that during the operation of a fuel cell of a fuel cell system more cathode gas than anode gas is used and consequently more cathode waste gas than anode waste gas is incurred, wherein the cathode gas and the anode gas each are fed to at least one anode arranged on the anode side or at least one cathode arranged on a cathode side of at least one fuel cell of the fuel cell system. In addition, a cooling gas, e.g. air, can be admixed to the cathode waste gas upstream of the combustion chamber.

With an advantageous further development of the solution according to the invention, a fuel cell system comprises a residual gas burner of the type described above. The fuel cell system comprises the at least one fuel cell, which comprises the anode side and the cathode side. Practically, one of the educt gas feeds is fluidically connected to the cathode side, while the other educt gas feed is fluidically connected to the anode side. Thus, the anode waste gas generated on the anode side can reach the combustion chamber of the residual gas burner through one of the educt gas feeds, while the cathode waste gas generated on the cathode side is fed to the combustion chamber through the other educt gas feed. Here, an embodiment is preferred wherein the first educt gas feed, which is designed for larger flow rates than the second educt gas feed, is fluidically connected to the cathode side, while the second educt gas feed is fluidically connected to the anode side. Consequently, anode waste gas flows into the combustion chamber through the second outlet openings facing the bottom surface while cathode gas flows into the combustion chamber through the first outlet openings.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar or functionally same components.

There it shows, in each case schematically.

DETAILED DESCRIPTION OF THE INVENTION

Figure 1:
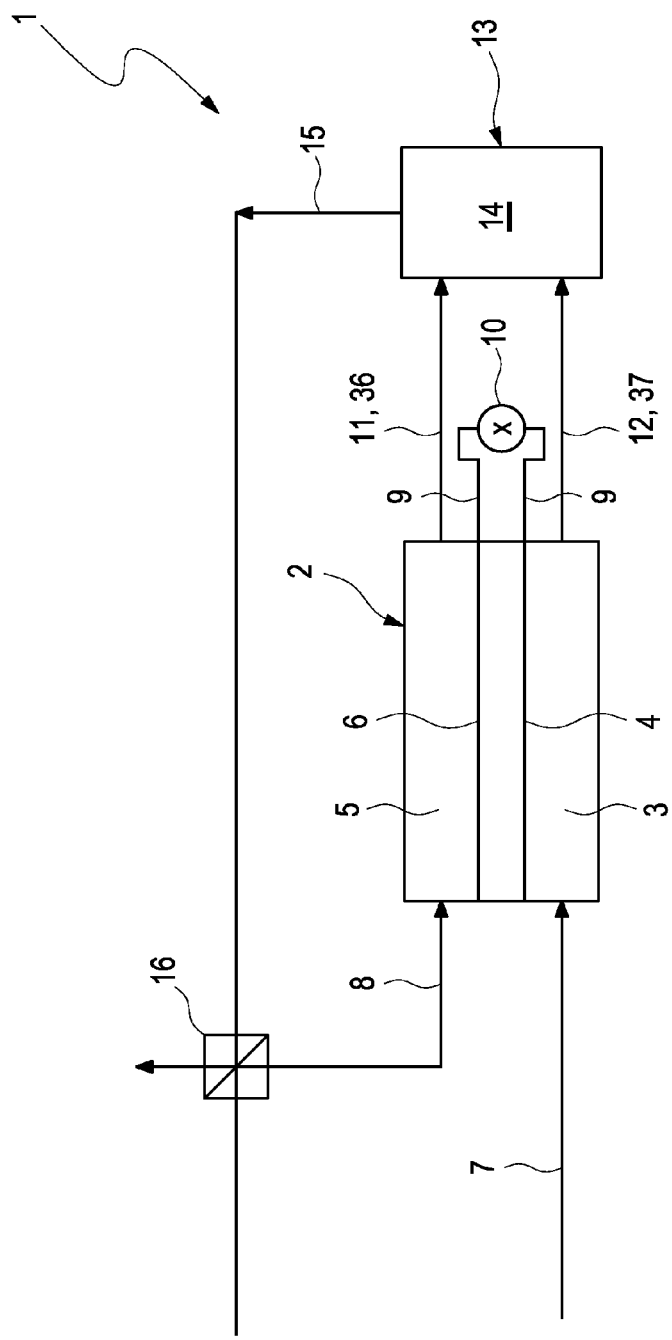
FIG. 1 a highly simplified representation of a fuel cell system in the manner of a circuit diagram, FIG. 2 a top surface view of a first educt gas feed and a second educt gas feed of a residual gas burner, FIG. 3 a lateral view of the residual gas burner, FIG. 4 an exploded representation of the residual gas burner.

According to FIG. 1, a fuel cell system 1 comprises at least one fuel cell 2, which on an anode side 3 comprises an anode 4 and on a cathode side 5 comprises a cathode 6. For operating the fuel cell system 1, the anode 4 is supplied with an anode gas and the cathode 6 is supplied with a cathode gas. To this end, an anode gas feed 7 is provided, which feeds the anode gas to the anode 4 on the anode side 3. In addition, a cathode gas feed 8 is provided, which feeds the cathode gas to the cathode 6 on the cathode side 5. The fuel cell 2 converts the chemical energy that is created during the chemical reaction of the cathode gas and of the anode gas into electrical energy and feeds the electrical energy for example in the form of an electrical voltage to an electric consumer 10 by means of electrical lines 9. In the process, anode waste gas generated on the anode side 3 and cathode waste gas on the cathode side 5. The cathode waste gas and the anode waste gas are fed to a residual gas burner 13 of the fuel cell system 1 as a first educt gas (cathode waste gas) and a second educt gas (anode waste gas) via a cathode waste gas ducting 36 or a first educt gas feed 11 and an anode waste gas ducting 37 or a second educt gas feed 12. The residual gas burner 13 comprises a combustion chamber 14, which the educt gases enter by means of the first educt gas feed 11 and the second educt gas feed 12. In the combustion chamber 14 a combustion of the educt gases takes place, in the process of which a hot burner waste gas is generated. The burner waste gas is conducted away from the residual gas burner 13 through a burner waste gas ducting 15. The burner waste gas ducting 15 is connected to the cathode gas feed 8 by means of a heat transfer device 16 in a heat-transferring manner, so that the heat generated by the residual gas burner 13 is transferred to the cathode gas.

Figure 2:
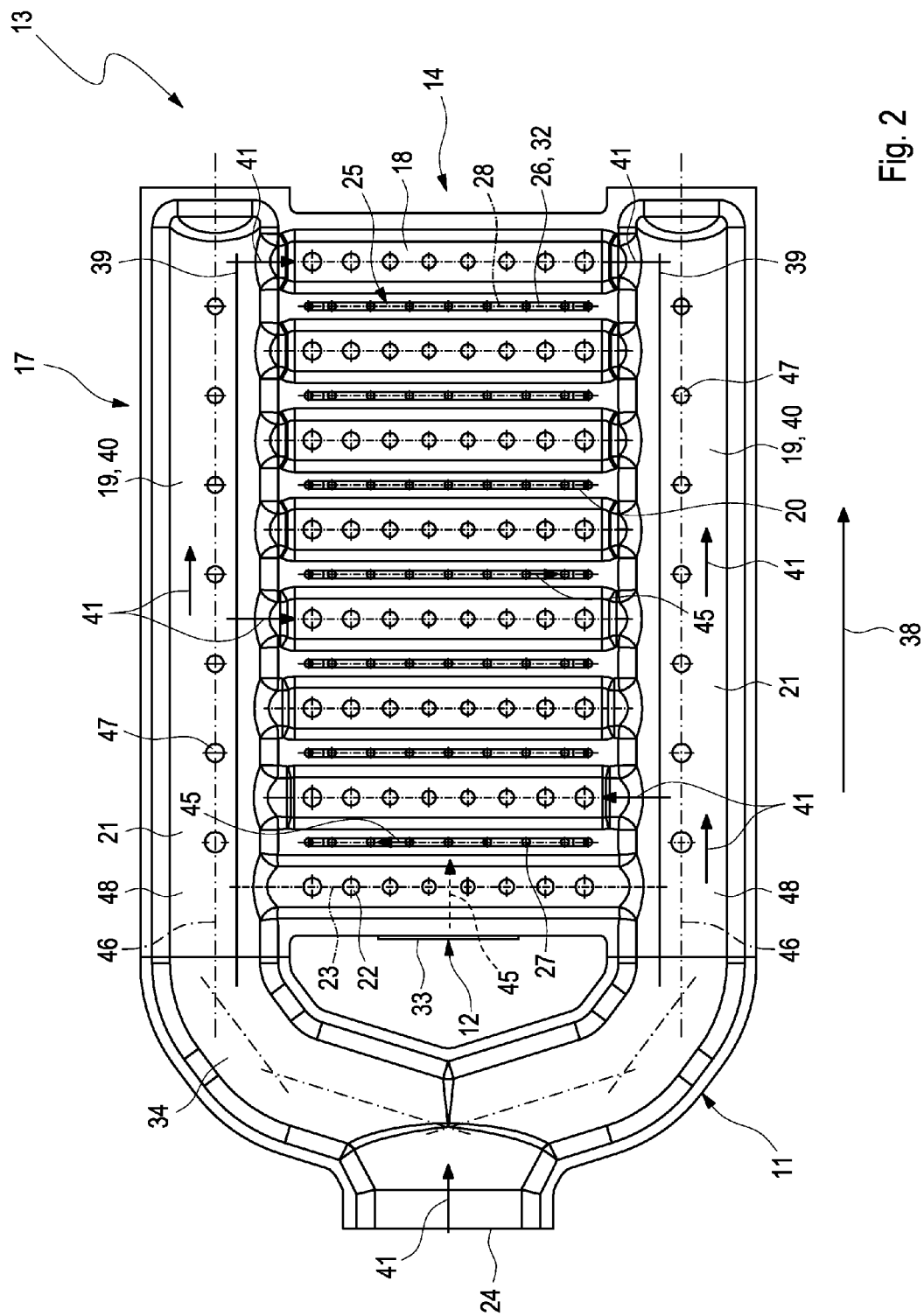
Figure 3:
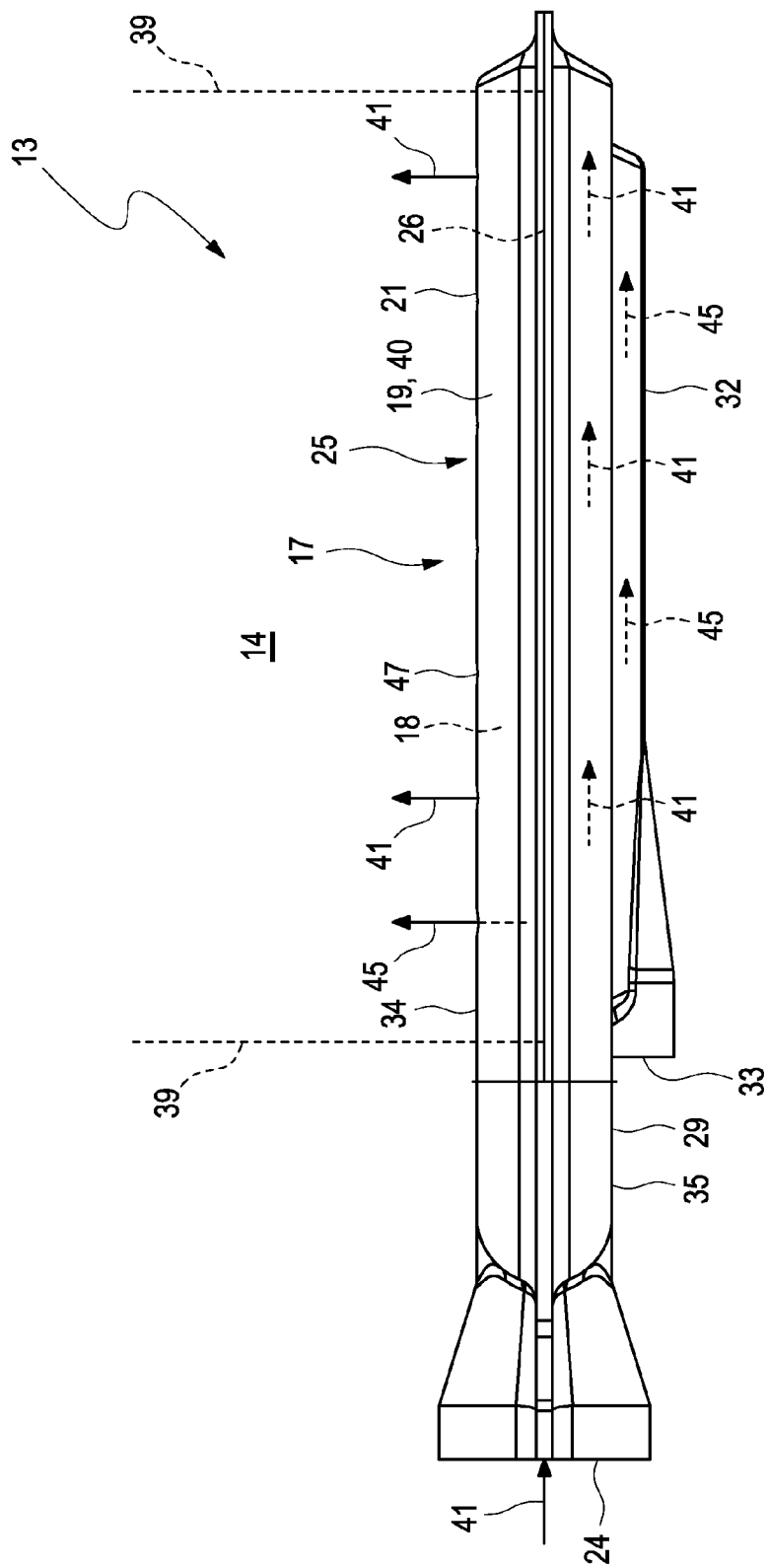
Figure 4:
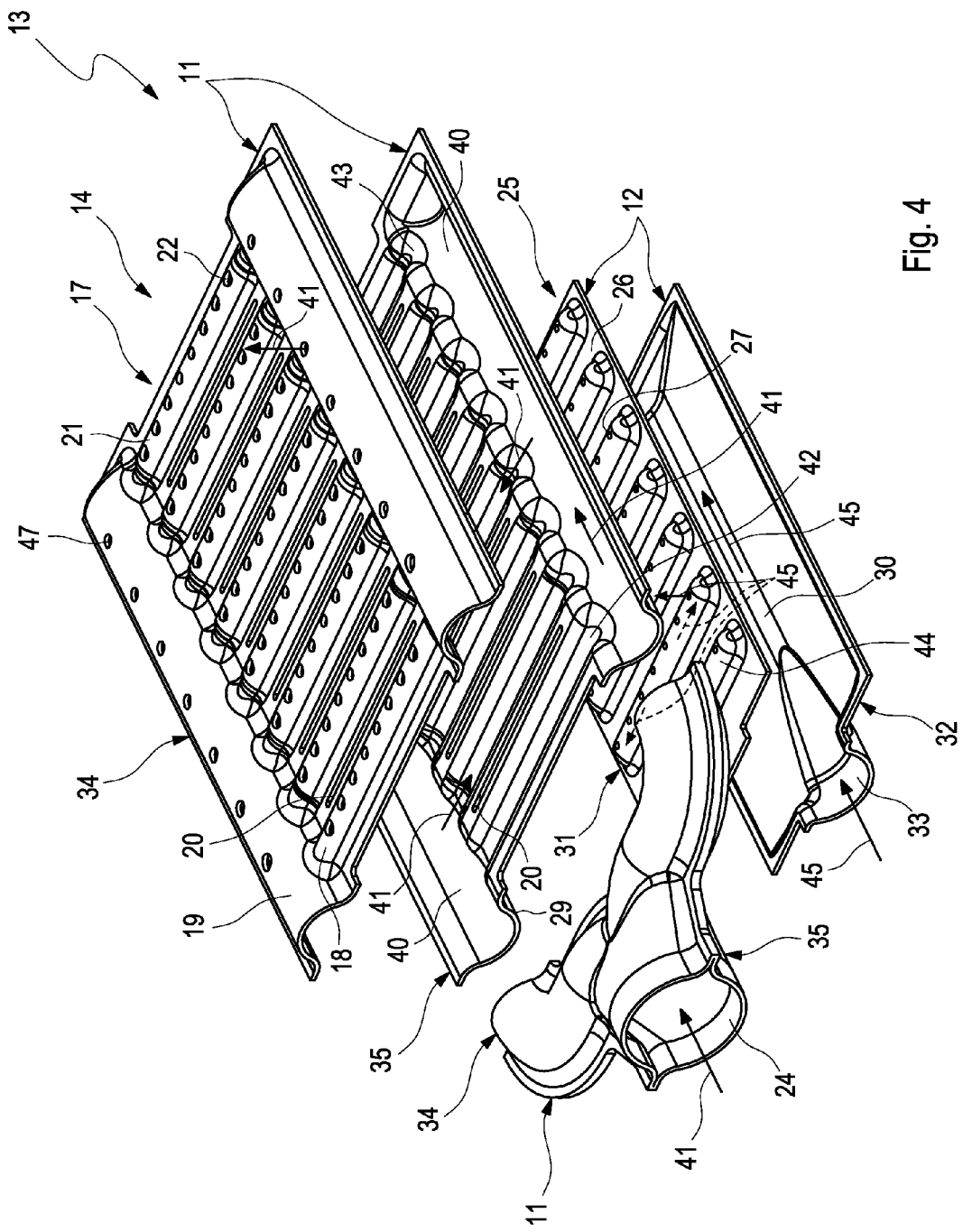

FIGS. 2 to 4 shows the residual gas burner 13. The first educt gas feed 11 is designed U-shaped and comprises a first outlet channel system 17, which comprises first channel 18 designed as pipes 18, which run parallel between legs 19 designed as first feed channels 40 of the first educt gas feed 11 formed U-shaped. The channels 18 running parallel are additionally spaced from one another along a direction 38 running perpendicular to the parallel arrangement and thus form slit-like passage openings 20 of the first outlet channel system 17. The first educt gas feed 11 and thus the first outlet channel system 17 additionally comprise a first top surface 21 facing the combustion chamber 14 delimited by walls 39. For letting out the first educt gas into the combustion chamber 14, first outlet openings 22 are arranged line-like along straight-line first lines 23 on the first top surface 21 of the first outlet channel system 17, wherein in each case one of the first lines 23 runs along the pipes 18. In addition, round bypass openings 47 are arranged on further straight bypass lines 46 along the first top surface 21 of the legs 19. The bypass openings 47 are arranged laterally in a marginal region 48 of the combustion chamber 14, so that the first educt gas flowing out through them is conducted laterally along the combustion chamber 14. In a combustion chamber of the residual gas burner 13, at least one bulkhead 39 can be provided, which separates the marginal region 48 from the actual combustion chamber 14. Between the bulkhead 39 and a wall of the combustion chamber which is not shown, a hollow space can then be formed which serves as bypass path. Via this bypass path, the first educt gas can be conducted past the combustion chamber 14. The bypass openings 47 running on the respective bypass lines 46 can thus be optionally arranged between such a bulkhead 39 of the combustion chamber 14 and an outer wall of the residual gas burner 13 which is not shown here, so that the bypass path leads through the hollow space thus formed and the associated educt gas can cool the residual gas burner 13 in the process. The respective bulkhead 39 can be configured overflowable distally from the first top surface 21, so that the first educt gas enters the combustion chamber 14 from the bypass path there. If however such a bulkhead is missing, the first educt gas flowing along the outer wall of the combustion chamber can already enter the combustion chamber 14 along the walls. However, the first educt gas flowing along the combustion chamber wall can form a protective layer which reduces a thermal loading of the combustion chamber wall.

The first outlet openings 22 have a round shape, wherein the size of the first outlet openings 22 on the respective pipes 18 decreases towards the centre of the respective pipe 18. The centre in this case refers to the spacing between the legs 19 of the first educt gas feed 11 running along the respective pipe 18. The decrease of the size of the first outlet openings 22 is thus present along a first flow direction in the first outlet channel system 17 indicated through arrows 41. The legs 19 of the first educt gas feed 11 merge into a first inlet 24 of the first outlet channel system 17. The first educt gas thus flows from the fuel cell 6 via the first inlet 24 into the respective leg 19 and subsequently through the bypass openings 47. Additionally, the first educt gas flows via the first inlet 24 into the respective leg 19 and via first channel inlets 42 into the respective pipes 18 and through the first outlet openings 22 into the combustion chamber 14. All first channel inlets 42, except for the channel inlets 42 of the pipe 18 next adjacent to the first inlet 24 each additionally comprise a constriction 43, wherein the constrictions 43 increase in size along the flow direction 41 in the legs 19. In addition, the constrictions 43 are integrally formed in the respective associated pipe 18 or in the first outlet channel system 17. Accordingly, the respective constriction 43 can be described as bottle neck of the associated pipe 18.

The second educt gas feed 12 comprises a second outlet channel system 25, which comprises a second top surface 26 facing the combustion chamber 14. In order to let the second educt gas flow into the combustion chamber 14, round second outlet openings 27 are linearly arranged on the second lines 28 running linearly along second channels 44 arranged in parallel and on the second top surface 26 of the second outlet channel system 25. The second top surface 26 faces a first bottom surface 29 of the first outlet channel system 11 facing away from the combustion chamber 14. With the view shown in FIG. 3, the second outlet openings 27 are thus arranged below the first outlet openings 22 so that the second outlet openings 27 are spaced further from the combustion chamber 14 than the first outlet openings 22. In addition, the bypass openings 47 are arranged above the first outlet openings 22. Furthermore, the second lines 28 are arranged parallel to the first lines 23 running along the pipes 18 and perpendicularly to the bypass lines 46 running along the legs 18 in such a manner that they and thus the second outlet openings 27 run aligned with the passage openings 20 designed slit-like perpendicularly to a plane in which the first lines 23 lie. Thus, the second educt gas flowing through the second outlet openings 27 can enter the combustion chamber 14 through the passage openings 20. The bypass openings 47 arranged along the bypass lines 46 running parallel to the legs 19 furthermore form the intersection between these first lines 23 and the second lines 28 in the top surface view shown in FIG. 2, so that along the flow direction in the first feed channels 40, the bypass openings 47 and the first channel inlets 47 alternate.

As is evident in FIG. 3, the second outlet channel system 25 is arranged on the first bottom surface 21 of the first outlet channel system 17 by means of the second top surface 26. In addition, the second outlet channel system 25 comprises a single second feed channel 30, which supplies all second channel 44 with second educt gas. The second feed channel 30 in this case is arranged in the middle of the second educt gas feed 12. The second outlet openings 27 and the second channels 44 are formed in a second outer shell 31 facing the combustion chamber 14 of the second educt gas feed 12 produced in shell design. The second educt gas feed 12 comprises a second inlet 33 for letting in the second educt gas into the second outlet channel system 17, so that the second educt gas reaches into the second feed channel 30 along a second flow direction of the second educt gas indicated by arrows 45 via the second inlet 33 and then via the second channels 44, the second outlet openings 27 and following this enters the combustion chamber 14 through the passage openings 20. The second feed channel 30 additionally tapers along the second flow direction in the second feed channel 30.

The first educt gas feed 11, too, as is evident in FIG. 4, is produced in shell design. To this end, the first educt gas feed 17 comprises a first upper shell 34 facing the combustion chamber 14 and a first lower shell 35 formed complementarily thereto and facing away from the combustion chamber 14. In FIG. 4, the region of the first inlet 24 is shown in the assembled state.

The respective lower shells 32, 35 and upper shells 31, 34 are each preferentially produced from a metal sheet through a deep-drawing method. In addition, the first educt gas feed 11 and the second educt gas feed 12 are formed as separate components. This makes possible a light, cost-effective and simple production of the residual gas burner 13. In addition, by arranging the first outlet openings 22 and the second outlet openings 27 and the suitable constrictions 43 and the taper, an improved mixing-through of the educt gases can take place, as a result of which the combustion of the educt gases in the combustion chamber 14 of the residual gas burner 13 is stabilised, which leads to an increase of the efficiency of the residual burner 13.

As is evident in particular in FIGS. 3 and 4, the first educt gas feed 11 is designed for larger gas flow rates than the second educt gas feed 12, so that the first educt gas feed 11 with approximately identical flow velocities, makes possible larger flow rates than the second educt gas feed 12. The fact that the different-size first outlet openings 22 are larger than the identical-size second outlet openings 27 also contributes to this.

Preferably, the first educt gas feed 11 is fluidically connected to the cathode side 5, while the second educt gas feed 12 is fluidically connected to the anode side. In particular, this means that the first educt gas feed 11 is configured as the cathode waste gas ducting 36 while the second educt gas feed 12 is configured as the anode waste gas ducting 37.

The invention claimed is:

1. A residual gas burner for a fuel cell system, comprising:
   a combustion chamber;
   a first educt gas feed and a second educt gas feed for feeding a first educt gas and a second educt gas to the combustion chamber;
   wherein the first educt gas feed comprises a first upper shell and a first lower shell and a first outlet channel system, which comprises a first top surface defined by the first upper shell facing the combustion chamber, which for letting out the first educt gas into the combustion chamber comprises at least one first outlet opening;
   wherein the second educt gas feed comprises a second upper shell and a second lower shell and a second outlet channel system, which comprises a second top surface defined by the second upper shell facing the combustion chamber, which for letting out the second educt gas into the combustion chamber comprises at least one second outlet opening; and
   wherein the first outlet channel system comprises a first bottom surface defined by the first lower shell facing away from the first top surface of the first upper shell, which faces the second top surface.

2. The residual gas burner according to claim 1, wherein the second outlet channel system is arranged on the first bottom surface of the first outlet channel system.

3. The residual gas burner according to claim 1, wherein the first outlet channel system comprises at least one passage opening spaced from the at least one first outlet opening, which is aligned with at least one second outlet opening.

4. The residual gas burner according to claim 3, wherein the first educt gas feed is designed U-shaped and comprises two legs, which are interconnected through pipes which are spaced by the at least one passage opening and run parallel and are formed as first outlet channel system, wherein at least one of the pipes comprises at least one first outlet opening.

5. The residual gas burner according to claim 1, wherein at least two of the first outlet openings have at least one of a different size and different shape.

6. The residual gas burner according to claim 1, wherein at least two of the second outlet openings have a different size and/or shape.

7. The residual gas burner according to claim 1, wherein the first educt gas feed comprises at least one bypass opening which is assigned to one of a lateral marginal of region the combustion chamber, or a bypass path.

8. A fuel cell system according claim 1, wherein channels of at least one of the first and second outlet channel systems comprise channel inlets for letting in the respective educt gas into the associated channels, which have different constrictions.

9. The fuel cell system according to claim 8, wherein the constrictions are integrally formed in the associated educt gas feed.

10. The fuel cell system according to claim 8, wherein the respective first and second educt gas feed each comprise at least one feed channel for feeding the associated educt gas into the associated channels, which taper along a flow direction of the educt gas.

11. The fuel cell system according to claim 8, wherein the first outlet openings are linearly arranged on first lines and/or the second outlet openings are linearly arranged on second lines, wherein at least two first lines and second lines run parallel, in particular parallel to the at least one pipe and/or that at least two first lines and second lines are alternately arranged along a direction transversely to the lines.

12. The residual gas burner according to claim 1, wherein the first educt gas feed is designed for larger flow rates than the second educt gas feed.

13. A fuel cell system comprising a residual gas burner according to claim 1, and having at least one fuel cell which comprises an anode side and a cathode side, and wherein one of the educt gas feeds is fluidically connected to the cathode side and the other educt gas feed is fluidically connected to the anode side.

14. A residual gas burner for a fuel cell system, comprising:
   a combustion chamber;

a first educt gas feed and a second educt gas feed for feeding a first educt gas and a second educt gas to the combustion chamber;

wherein the first educt gas feed comprises a first outlet channel system, which comprises a first top surface facing the combustion chamber, which for letting out the first educt gas into the combustion chamber comprises at least one first outlet opening;

wherein the second educt gas feed comprises a second outlet channel system, which comprises a second top surface facing the combustion chamber, which for letting out the second educt gas into the combustion chamber comprises at least one second outlet opening;

wherein the first outlet channel system comprises a first bottom surface facing away from the first top surface, which faces the second top surface; and wherein at least two of the first outlet openings have at least one of a different size and different shape.

15. A residual gas burner for a fuel cell system, comprising:
a combustion chamber;
a first educt gas feed and a second educt gas feed for feeding a first educt gas and a second educt gas to the combustion chamber;

wherein the first educt gas feed comprises a first outlet channel system, which comprises a first top surface facing the combustion chamber, which for letting out the first educt gas into the combustion chamber comprises at least one first outlet opening;

wherein the second educt gas feed comprises a second outlet channel system, which comprises a second top surface facing the combustion chamber, which for letting out the second educt gas into the combustion chamber comprises at least one second outlet opening;

wherein the first outlet channel system comprises a first bottom surface facing away from the first top surface, which faces the second top surface; and wherein at least two of the second outlet openings have a different size and/or shape.

16. A residual gas burner for a fuel cell system, comprising:
a combustion chamber;
a first educt gas feed and a second educt gas feed for feeding a first educt gas and a second educt gas to the combustion chamber;

wherein the first educt gas feed comprises a first outlet channel system, which comprises a first top surface facing the combustion chamber, which for letting out the first educt gas into the combustion chamber comprises at least one first outlet opening;

wherein the second educt gas feed comprises a second outlet channel system, which comprises a second top surface facing the combustion chamber, which for letting out the second educt gas into the combustion chamber comprises at least one second outlet opening;

wherein the first outlet channel system comprises a first bottom surface facing away from the first top surface, which faces the second top surface;

wherein the first outlet channel system comprises at least one passage opening spaced from the at least one first outlet opening, which is aligned with at least one second outlet opening; and wherein the first educt gas feed is designed U-shaped and comprises two legs, which are interconnected through pipes which are spaced by the at least one passage opening and run parallel and are formed as first outlet channel system, wherein at least one of the pipes comprises at least one first outlet opening.

* * * * *